(12) United States Patent
Nakagawa

(10) Patent No.: US 8,106,996 B2
(45) Date of Patent: Jan. 31, 2012

(54) IMAGE PICKUP APPARATUS

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 12/411,078

(22) Filed: Mar. 25, 2009

(65) Prior Publication Data

US 2009/0244312 A1 Oct. 1, 2009

(30) Foreign Application Priority Data

Mar. 28, 2008 (JP) ................................. 2008-088824

(51) Int. Cl.
*G03B 13/00* (2006.01)
(52) U.S. Cl. ...................................................... 348/345
(58) Field of Classification Search ................... 348/345
See application file for complete search history.

(56) References Cited

U.S. PATENT DOCUMENTS

| 2007/0003267 A1 | 1/2007 | Shibutani |
| 2007/0286589 A1* | 12/2007 | Ishiwata et al. ............... 396/125 |
| 2009/0073304 A1* | 3/2009 | Kumagai et al. ............... 348/345 |

FOREIGN PATENT DOCUMENTS

JP 2007-010898 1/2007

* cited by examiner

*Primary Examiner* — Rodney Fuller
(74) *Attorney, Agent, or Firm* — Cowan, Liebowitz & Latman, P.C.

(57) ABSTRACT

An image pickup apparatus includes a face detector configured to provide a face detection process based on image data obtained from an image pickup optical system that includes a focus lens configured to provide a focus control, a focus lens position extractor configured to extract a focus lens position at which the face detector has actually provided a successful face detection process from among focus lens positions set as a candidate position for the focus lens to be arranged when the face detector provides the face detection process, a focus control range setting part configured to set a focus control range in a focus range that contains the focus lens position extracted by the focus lens position extractor, and an autofocus controller configured to provide autofocus control in the focus control range set by the focus control range setting part.

9 Claims, 16 Drawing Sheets

| LENS UNIT NAME | FOCAL LENGTH (TELE) | FOCAL LENGTH (WIDE) | RELEASE STOP VALUE | MINIMUM STOP VALUE | ... | ... | ... |
|---|---|---|---|---|---|---|---|
| TELEPHOTO A | 200 | 200 | 2.8 | 22.0 | ... | ... | ... |

FIG. 8

| LENS UNIT NAME | FOCAL LENGTH | STOP | MOVING POSITION INFORMATION |
|---|---|---|---|
| TELEPHOTO A | 200 | 2.8 | 1.5 3.0 5.0 7.0 10.0 ∞ |
| | | ... | ... |
| | | 22 | 2.0 5.0 8.0 ∞ |
| STANDARD B | 50 | 2.8 | 0.45 1.0 1.5 3.0 ∞ |
| | | ... | ... |
| | | 22 | 0.8 2.0 ∞ |
| WIDE-ANGLE C | 24 | 2.8 | 0.5 1.0 2.0 ∞ |
| | | ... | ... |
| | | 22 | 1.0 ∞ |

FIG. 9

| FOCAL LENGTH | STOP | MOVING POSITION INFORMATION |
|---|---|---|
| 200 | 2.8 | 1.5 3.0 5.0 7.0 10.0 ∞ |
| | ... | ... |
| | 22 | 2.0 5.0 8.0 ∞ |
| ... | 2.8 | ... |
| | ... | ... |
| | 22 | ... |
| 50 | 2.8 | 0.45 1.0 1.5 3.0 ∞ |
| | ... | ... |
| | 22 | 0.8 2.0 ∞ |
| ... | 2.8 | ... |
| | ... | ... |
| | 22 | ... |
| 24 | 2.8 | 0.5 1.0 2.0 ∞ |
| | ... | ... |
| | 22 | 1.0 ∞ |

FIG. 18

IMAGE PICKUP APPARATUS

BACKGROUND OF THE INVENTION

1. Field of the Invention

The present invention relates to an image pickup apparatus.

2. Description of the Related Art

One conventionally known autofocus ("AF") system equipped in an image pickup apparatus is a contrast type focus detector that sequentially obtains images from an image sensor, and searches for a contrast peak of a subject. In addition, in photographing a person, it is known to extract a face area in a screen and to provide focusing on the extracted face area so as to focus the person to be photographed.

Japanese Patent Laid-Open No. 2007-10898 proposes a method for extracting a face area of a subject through face recognitions of a pan focus process, and for providing a focus control process for the extracted face area in the screen.

However, according to the contrast type focus detection, an image plane moving amount becomes large from the closest end to the infinite end as a focal length of an imaging lens is longer, requiring a longer focus detection time period. In addition, as the focal length of the imaging lens is longer, a depth of field becomes too shallow to provide the pan focus process and the face area cannot be detected with the pan focus process.

SUMMARY OF THE INVENTION

The present invention provides an image pickup apparatus that can shorten a focus control time period.

An image pickup apparatus according to one aspect of the present invention includes a face detector configured to provide a face detection process based on image data obtained from an image pickup optical system that includes a focus lens configured to provide a focus control, a focus lens position extractor configured to extract a focus lens position at which the face detector has actually provided a successful face detection process from among focus lens positions set as a candidate position for the focus lens to be arranged when the face detector provides the face detection process, a focus control range setting part configured to set a focus control range in a focus range that contains the focus lens position extracted by the focus lens position extractor, and an autofocus controller configured to provide autofocus control in the focus control range set by the focus control range setting part.

Further features of the present invention will become apparent from the following description of exemplary embodiments (with reference to the attached drawings).

BRIEF DESCRIPTION OF THE DRAWINGS

FIG. 8 is a view showing lens information of a telephoto lens A.

FIG. 9 shows moving position information corresponding to a variety of lenses.

FIG. 18 is a view showing moving position information corresponding to a focal length and a stop value.

DESCRIPTION OF THE EMBODIMENTS

Referring now to the accompanying drawings, a description will be given of embodiments of the present invention.

First Embodiment

Figure 1:
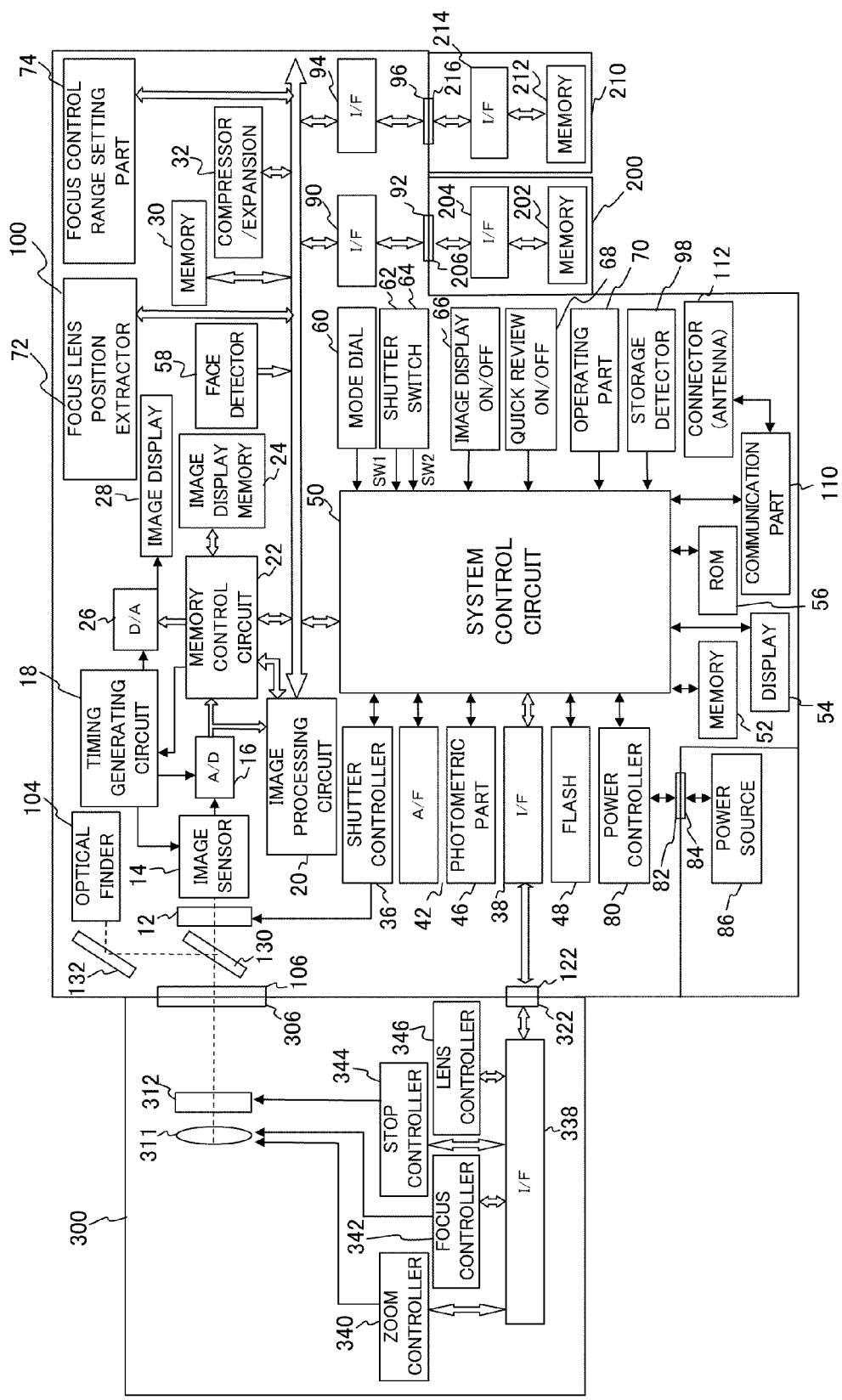
FIG. 1 is a block diagram showing a structure of a lens exchange type digital camera.

FIG. 1 is a block diagram of a lens exchange type digital camera according to a first embodiment. The digital camera shown in FIG. 1 includes a camera body (image pickup apparatus) 100, and a lens unit (image pickup optical system) 300 that can be exchangeably attached to the camera body 100.

Reference numeral 12 denotes a shutter configured to control an exposure amount to an image sensor 14. Reference numeral 14 denotes the image sensor configured to convert an optical image into an electric signal. Reference numeral 16 denotes an A/D converter configured to convert an analog signal into a digital signal (image data). Reference numeral 18 denotes a timing generating circuit configured to supply a clock signal and a control signal to the image sensor 14, the A/D converter 16, and a D/A converter 26, and is controlled by a memory control circuit 22 and a system control circuit 50.

Reference numeral 20 denotes the image processing circuit configured to provide a pixel interpolation process and a color conversion process for image data from the A/D converter 16 or image data from the memory control circuit 22. The image processing circuit 20 provides an operation process using image data. The system control circuit 50 provides controls a shutter controller 36, a focus controller 342, and a stop controller 344 in accordance with an AF process of a TTL system, an auto exposure ("AE") process, and an EF (flash pre-emission) process, based on the obtained operation result. Moreover, the image processing circuit 20 performs an auto white balance ("AWB") of the TTL system based on the obtained operation result.

Reference numeral 58 denotes a face detector, which provides a face detection process for image data from the image processing circuit 20 or image data from the memory control circuit 22. The face detection process performed by the face detector 58 is not particularly limited as long as it is a method that uses image data of a subject for the face detection process.

Reference numeral 22 denotes the memory control circuit, which controls the A/D converter 16, the timing generating circuit 18, the image processing circuit 20, the image display memory 24, the D/A converter 26, a memory 30, and a compression/expansion circuit 32. Data of the A/D converter 16 is written in the image display memory 24 or memory 30 via the image processing circuit 20 and the memory control circuit 22 or directly via the memory control circuit 22.

Reference numeral 24 denotes the image display memory. Reference numeral 26 denotes the D/A converter. Reference numeral 28 denotes an image display including a liquid crystal monitor, etc., and the image data for display written in the image display memory 24 is displayed by the image display 28 via the D/A converter 26. An electronic finder function can be implemented when photographed image data is sequentially displayed with the image display 28. The image display 28 can arbitrarily turn on and off the display by command of the system control circuit 50, and when the display is turned off, the power consumption of the camera body 100 can be significantly reduced.

Reference numeral 30 denotes the memory, which stores photographed still and motion pictures, and has a capacity enough to store the predetermined number of still pictures and the motion pictures for a predetermined time period. Thereby, in panoramic shooting or consecutive shooting that consecutively shoots a plurality of still pictures, quick and extensive images can be stored in the memory 30. The memory 30 can use an operation area of the system control circuit 50.

Reference numeral 32 denotes the compression/expansion circuit, which compresses or expands image data using an adaptive discrete cosine transform ("ADCT"), etc., reads image stored in the memory 30 and performs a compression process or a expansion process for it, and writes the processed image data in the memory 30. Reference numeral 36 denotes the shutter controller, which controls the shutter 12 based on the photometric information from a photometric part 46 in association with the stop controller 344 that controls the stop 312. Reference numeral 38 denotes an interface configured to connect the camera body 100 to the lens unit 300 in the lens mount 106. Reference numeral 122 denotes a connector that electrically connects the camera body 100 to the lens unit 300.

Reference numeral 42 denotes an AF part (autofocus controller) configured to provide an AF process (autofocus control process). An on-focus state of an image that forms an optical image can be measured by introducing a ray incident upon the lens 311 to the AF part 42 via the stop 312, lens mounts 306 and 106, and a mirror 130, and an AF sub-mirror (not shown). The system control circuit 50 can provide an exposure control and an AF control for the shutter controller 36, the focus controller 342 and the stop controller 344 based on an operation result of the image data from the image sensor 14 operated by the image processing circuit 20. Moreover, the AF control may be provided by using both the measurement result by the AF part 42 and the operation result of the image data from the image sensor 14 operated by the image processing circuit 20.

Reference numeral 46 denotes the photometric part for the AE process. An exposure state of an image that forms an optical image can be measured by introducing a ray incident upon the lens 311 to the photometric part 46 via the stop 312, the lens mounts 306 and 106, the mirrors 130 and 132, and a photometric lens (not shown). The photometric part 46 serves to provide an EF process in association with the flash 48. Reference numeral 48 denotes the flash, which has a light projection function and flash compensation function of the AF auxiliary light.

Reference numeral 50 denotes the system control circuit (controller) configured to control the entire camera body 100.

Reference numeral 52 denotes a memory configured to store a constant, a variable, and a program for operations of the system control circuit 50.

Reference numeral 54 denotes a display, such as a liquid crystal display and a speaker, configured to display an operation state and a message by using a letter, an image, and a voice in accordance with an execution of the program in the system control circuit 50. One or more displays 54 are located at easily visually confirmable positions near the operating part of the camera body 100, and include, for example, a combination of an LCD, an LED, and a sound generator. Part of the functions of the display 54 is installed in the optical finder 104. The display contents of the display 54 to be displayed on the LCD etc. contain information relating to the number of shots, such as the recording number and the residual recordable number, information relating to a shooting condition, such as a shutter speed, a stop value, an exposure correction, and a flash, a battery residual quantity, the date and time, etc. The display contents to be displayed on the optical finder 104 contain an on-focus state, an image stabilization alarm, a flash charge, a shutter speed, a stop value, an exposure correction, etc.

Reference number 56 denotes a ROM, such as an EEPROM, which can electrically erase and record information.

Reference numerals 60, 62, 64, 66, 68, and 70 denote operating parts that are configured to input a variety of operational commands of the system control circuit 50, and include a switch, a dial, a touch panel, a pointing device for eye-controlled detections, a voice recognition unit, singularly or in combination.

Reference numeral 60 denotes a mode dial switch, which switches and sets a variety of functional modes, such as a power-off, an auto photography mode, a manual photography mode, a panoramic photography mode, a micro photography mode, a reproduction mode, a multi-screen reproduction/erase mode, and a PC connection mode.

Reference numeral 62 denotes a shutter switch SW1, which turns on when a shutter button (not shown) is half-pressed, and commands a start of an operation, such as the AF process, the AE process, the AWB process, and the EF process.

Reference numeral 64 denotes a shutter switch SW2, which turns on when a shutter button (not shown) is fully pressed, and commands a start of an operation of a series of photography related processes. The photography related process includes an exposure process, a development process, and a recording process. The exposure process writes as image data a signal read from the image sensor 14 in the memory 30 via the A/D converter 16 and the memory control circuit 22. The development process provides a development using an operation by the image processing circuit 20 or the memory control circuit 22. The recording process reads the image data out of the memory 30, compresses it at the compression/expansion circuit 32, and writes the image data in the recording medium 200 or 210.

Reference numeral 66 denotes an image display on/off switch, which can set turning on and off of the image display 28. This function can save the power by blocking the current supply to the image display that includes a liquid crystal monitor, etc., in the photography using the optical finder 104.

Reference numeral 68 is a quick review on/off switch, which sets a quick review function that automatically reproduces photographed image data just after the photography. In particular, this embodiment provides a function that sets a quick review function when the image display 28 is turned off.

Reference numeral 70 denotes an operating part that includes a variety of buttons and a touch panel. A variety of buttons include a menu button, a flash setting button, a single shooting/consecutive shooting/self timer switching button, a selection moving button, an imaging quality selection button, an exposure correction button, a data/time setting button, etc.

Reference numeral 72 denotes a focus lens position extractor configured to extract a focus lens position at which the focus detection process is successful. Reference numeral 74 is a focus control range setting part configured to set a focus control range in the focus range that contains a focus lens position at which the face detection process is successful.

Reference numeral 80 denotes a power controller, which includes a battery detection circuit, a DC/DC converter, a switching circuit that switches an electrified block, etc. The power controller 80 detects whether or not the battery is attached, a type of a battery, a battery's residual quantity, controls the DC/DC converter based on the detection result and a command of the system control circuit 50, and supplies a necessary voltage to each component including a recording medium for a necessary time period. Reference numerals 82 and 84 denote connectors. Reference numeral 86 is a power supply that includes a primary battery, such as an alkali battery or a lithium battery, a secondary battery, such as a NiCd battery, a NiMH battery, and a Li battery, an AC adapter, or the like.

Reference numerals 90 and 94 denote interfaces with recording media, such as a memory card and a hard disc drive. Reference numerals 92 and 96 denote connectors for connections with recording media, such as a memory card or a hard disc drive. Reference numeral 98 is a recording medium detector configured to detect whether or not a recording medium is attached to the connector 92 or 96.

While this embodiment provides two sets of interfaces and connectors to which the recording medium is attached, the number of sets of the interface and the connector to which the recording medium is attached may be singular or plural. They may combine the interfaces and connectors of different standards. In addition, the interface and the connector may use a standard, such as a PCMCIA card or a compact flash ("CF") card.

Moreover, by connecting a variety of communication card, such as a LAN card or a modem card, to the interface and connector, image data and control information attached to the image data can be transferred to another peripheral, such as a computer and a printer.

Reference numeral 104 denotes the optical finder, which guides a ray incident upon the lens 311 via the stop 312, the lens mounts 306 and 106, and the mirrors 130 and 132, and forms and displays an optical image. Thereby, shooting with only the optical finder 104 is available without an electronic finder function using the image display 28. The optical finder 104 has part of the functions of the display 54, such as a focus display, an image stabilization alarm display, a flash charge display, a shutter speed display, a stop value display, and an exposure correction display.

Reference numeral 110 denotes a communication part, and includes a variety of communication functions, such as RS232C, USB, IEE1394, P1284, SCSI, a modem, a LAN, and a radio communication. Reference numeral 112 denotes a connector used to connect the camera body 100 to another unit via the communication part 110 or an antenna in case of radio communications. The connector 122 communicates a control signal, a state signal, and a data signal between the camera body 100 and the lens unit 300, and serves to supply the currents for a variety of voltages. The connector 122 may serves to provide an optical communication, a voice communication, etc., rather than an electric communication.

Reference numerals 130 and 132 denote mirrors, which guide a ray incident upon the lens 311 to the optical finder 104 by the single-lens reflex system. The mirror 130 may have either a quick return mirror structure or a half-mirror structure. A structure other than the single-lens reflex system which does not use the mirrors 130 and 132 may be used.

Reference numerals 200 and 210 denote recording media, such as a memory card or a hard disc drive. The recording media 200 and 210 include memories 202 and 212, such as a semiconductor memory and a magnetic disc, the interfaces 204 and 214 with the camera body 100, and the connectors 206 and 216 for connections with the camera body 100.

Reference numeral 300 denotes an exchange lens type of a lens unit (image pickup optical system), which can be mounted onto the camera body 100. Reference numeral 306 denotes the lens mount that mechanically couples the lens unit 300 with the camera body 100. The lens mount 306 has a variety of functions used to electrically connect the lens unit 300 to the camera body 100. Reference numeral 311 denotes a lens. Reference numeral 312 denotes a stop. The lens 311 includes a focus lens used to provide a focus control of a subject.

Reference numeral 322 denotes the connector, which electrically connects the lens unit 300 to the camera body 100. Reference numeral 338 denotes an interface that connects the lens unit 300 to the connector 122 of the camera body 100. The connector 322 serves to communicate a control signal, a state signal, a data signal, etc., between the camera body 100 and the lens unit 300, and receive or supply the currents of a variety of voltages. The connector 322 may serve to provide an optical communication, a voice communication etc., rather than an electric communication.

Reference numeral 340 denotes a zoom controller configured to control zooming of the lens 311. Reference numeral 342 denotes a focus controller configured to control focusing of the lens 311. When the lens unit 300 is of a single focus lens type having no zoom function, the zoom controller 340 may be omitted. Reference numeral 344 is a stop controller configured to control the stop 312 in association with the shutter controller 36 configured to control the shutter 12, based on the photometric information from the photometric part 46. Reference numeral 346 is a lens system controller configured to control the entire lens unit 300. The lens system controller 346 has a memory function configured to store a constant, a variable, and a program for lens unit operations, a ROM function configured to store identification information such as a lens-unit specific number, control information, functional information, such as a release stop value, a minimum stop value, and a focal length, current and past set values, and a calculation function of moving position information, which will be described later.

Next, the moving position information will be described. The moving position information determines a focus lens position set as a candidate position at which the focus lens is to be arranged in the focus detection process by the focus detector 58. The face can be detected with image data obtained when the focus lens is moved to the focus lens position determined by the moving position information, even when the subject is located at any positions between the closest end and the infinity. For example, for the same subject, the face cannot be detected with image data obtained when the focus lens is moved to a certain moving position, but the face can be detected with image data obtained when the focus lens is moved to a different moving position. Thus, the face of the subject can be detected in the overall focusable distance range from the closest end to the infinity.

The moving position information is set based on a depth of field ("DOF"). The DOF is a sum of a front DOF and a back DOF, which indicate a DOF at the front side and a DOF at the backside of the subject viewed from the lens side. Each DOF is expressed as follows with a diameter "d" of the allowance scattering circle, a stop value "F," a subject distance "a," and a focal length "f." A diameter of the allowance scattering circle is determined by a cell pitch of the image sensor 14, and calculated from the size and the number of pixels of the image sensor 14.

$$\text{Front DOF} = d \times F \times a^2 / (f^2 + d \times f \times a) \quad \text{EQUATION 1}$$

$$\text{Back DOF} = d \times F \times a^2 / (f^2 - d \times f \times a) \quad \text{EQUATION 2}$$

$$\text{DOF} = \text{Front DOF} + \text{Back DOF} \quad \text{EQUATION 3}$$

Figure 2:
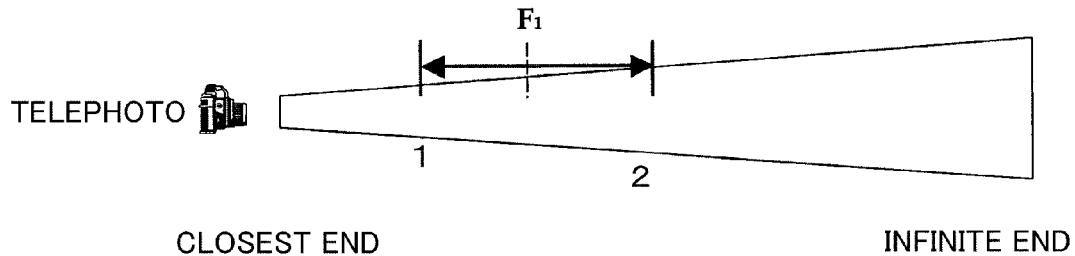
FIG. 2 is a view showing a depth of field of a telephoto lens having a long focal length.

A telephoto lens has a long focal length and a shallow DOF, and thus can have a DOF at points 1 or 2 near the set focus lens position F1, as shown in FIG. 2. As shown FIG. 3, in order to detect the face from the closest end to the infinity end, it is necessary to detect the face from the closest end 1 to the infinity end 5 by providing detections at a plurality of focus lens positions F1 to F4.

Figure 3:
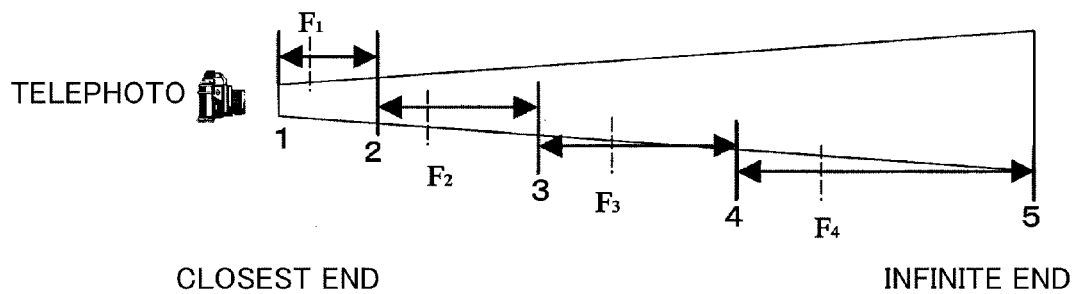
FIG. 3 is a view of a plurality of divided areas with the telephoto lens to cover the closest end to the infinite end.
Figure 4:
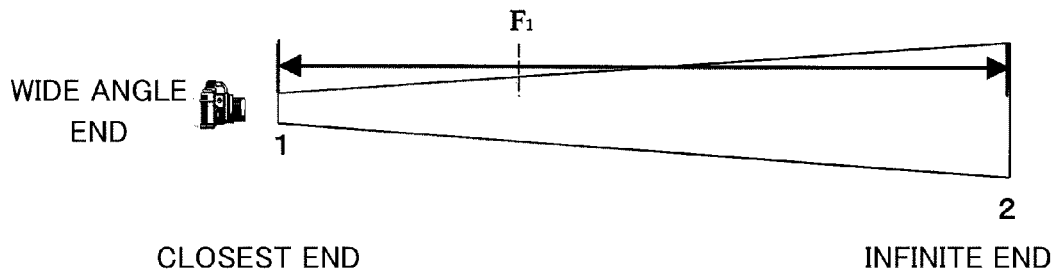
FIG. 4 is a view showing a depth of field of a wide-angle lens having a short focal length.

On the other hand, since a wide-angle lens has a short focal length and a deep DOF, the DOFs can be shown simultaneously from the closest end 1 to the infinity end 2 by setting a focus lens position F1 to a predetermined focus position, as shown in FIG. 4. The focus lens positions and the DOFs shown in FIGS. 2 to 4 are merely illustrative.

Figure 5:
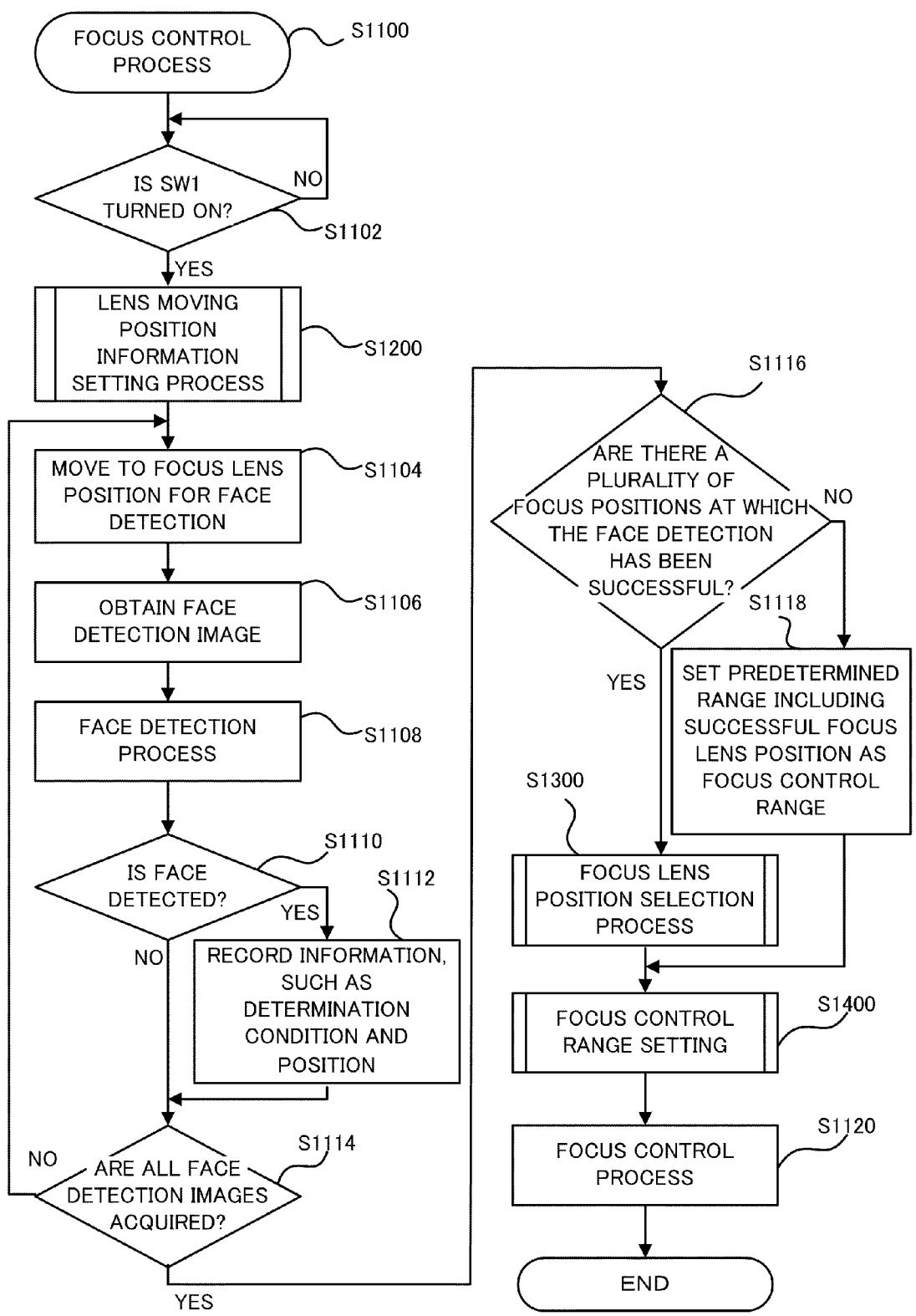
FIG. 5 is a flowchart of a focus control process based on moving position information of a focus lens.

Referring now to FIG. 5, a description will be given of a focus control process S1100 of the digital camera. FIG. 5 is a flowchart for explaining the focus control process S1100 based on the moving position information of the focus lens. In FIG. 5, "S" denotes the step, and this is true of other figures.

Initially, the system control circuit 50 determines whether or not the shutter switch SW1 is turned on (S1102). When the system control circuit 50 determines that the shutter switch SW1 is turned on in S1102, the flow moves to a moving position information setting process S1200. The moving position information setting process S1200 will be described with reference to FIG. 7, which will be described later.

Next, the system control circuit 50 drives the imaging lens 311 to a focus lens position set in the moving position information setting process S1200 (S1104), and the focus detector 58 obtains a face detection image from the image process circuit 20 (S1106). Next, the face detector 58 performs the face detection process for the obtained face detection image (S1108), and the system control circuit 50 determines whether the face detection process has been successful (or whether the face detector 58 has actually provided a successful face detection process) (S1110).

Figure 6A:
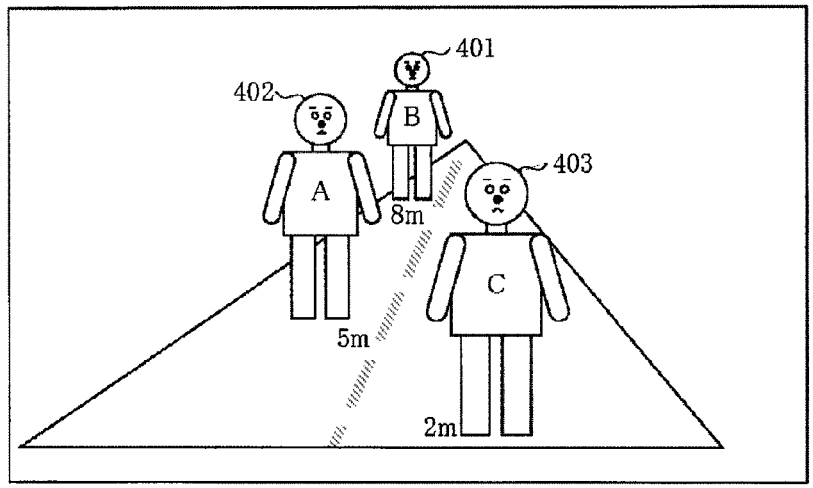
FIGS. 6A-6L are views showing a face detection result according to the depth of field.
Figure 6B:
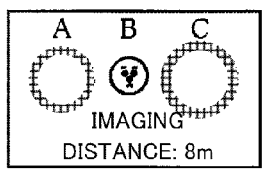
Figure 6C:
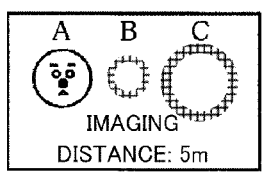
Figure 6D:
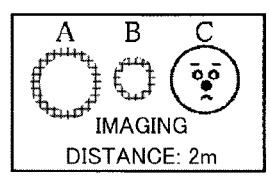

Referring to FIGS. 6A-6L, a description will be given of a face detection result by changing a moving position of a focus lens when the DOF changes. FIG. 6A shows one example of a field image in which there are Messrs. A, B, and C as subjects. FIGS. 6B-6F show face detection results of Messrs. A, B, and C. As shown in FIG. 6A, Mr. A stands at 5 m (at position 402), Mr. B stands at 8 m (at position 401), and Mr. C stands at 2 m (at position 403) from a photographer, and the photography is made to include these three persons in the same screen. The photography uses a telephoto lens A having a long focal length and a shallow DOF for the lens unit 300.

Figure 6E:
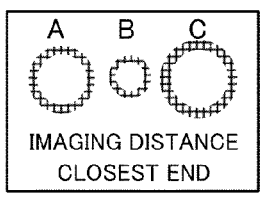
Figure 6F:
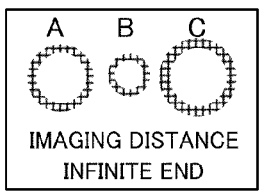

When image data is obtained after the telephoto lens A is mounted and the focus lens is moved and focused on the position 401 of 8 m at which Mr. B stands, the faces of Messrs. A and C are blurred and cannot be detected because the DOF is shallow (FIG. 6B) When the image data is obtained after the focus lens is moved and focused upon the position of 5 m at which Mr. A stands, the faces of Messrs. B and C are blurred and cannot be detected because the DOF is shallow (FIG. 6C) When the image data is obtained after the focus lens is moved and focused upon the position of 2 m at which Mr. C stands, the faces of Messrs. A and B are blurred and cannot be detected because the DOF is shallow (FIG. 6D) When the image data is obtained after the focus lens is moved and focused upon the closest end, all the faces of Messrs. A, B, and C are blurred and cannot be detected because the DOF is shallow (FIG. 6E). When the image data is obtained after the focus lens is moved and focused upon the infinity, all the faces of Messrs. A, B, and C are blurred and cannot be detected because the DOF is shallow (FIG. 6F). Thus, even when the focus lens is moved to any positions, all the faces of the three persons cannot be simultaneously detected from the obtained image data.

When a stop value in the photography of the telephoto lens A is F22 that is the minimum stop value, the DOF can be made deeper. For example, assume a face detection process for image data obtained when the focus lens is moved and focused upon four points of 2.0 m, 5.0 m, 8.0 m, and the infinity as in the moving position information shown in FIG. 9. Then, the faces of the three subjects shown in FIG. 6A can be detected. Even when the subject is located at a closer position or a farther position, the face can be detected from the obtained image data.

Usually, in order to reduce the number of moving positions of the focus lens and the number of face detection processes for the face detection, a stop value is made larger so as to make a DOF deeper, but the stop value cannot be made larger in some cases where the photography image is affected, for example, in the room and night photography. As a solution for that situations, assume photography with a stop value of F2.8 as a release stop value after the telephoto lens A is mounted. In that case, for example, assume a focus detection process with image data obtained when the focus lens is moved and focused upon six points of 1.5 m, 3.0 m, 5.0 m, 7.0 m, 10.0 m, and the infinity as in the moving position information in FIG. 9. Then, the faces of the three subjects shown in FIG. 6A can be detected. Even when the subject is located at a closer position or a farther position, the faces can be detected from the obtained image data.

When the moving position of the focus lens is changed as the stop value thus changes, the moving position of the focus lens can be optimized in obtaining the image data in the face detection process. Thereby, the face of the subject can be detected in an overall focusable distance range from the closest end to the infinity, and the number of moving positions of the focus lens and the number of face detection processes can be reduced for the face detection, and a time period necessary for the face detection can be shortened.

When a plurality of faces is detected as discussed above, a face of a main subject is selected from the detected faces. In selecting the face of the main subject, a user arbitrarily selects the face of the main subject or it is automatically selected based on the moving position of the focus lens at which the face detection image is obtained, the size of the detected face, and the position of the detected face in the photography image. By the focus control and exposure correction according to the selected face of the main subject, the main subject on which the photographer relies can be quickly and precisely shot with an optimal photography parameter.

FIGS. 6G-6L show face detection results for Messrs. A, B, and C as the subjects similar to FIGS. 6B-6F. While FIG.

6B-6F show the results with the telephoto lens A mounted, FIGS. 6G-6L show results with a standard lens B mounted. The standard lens B is a lens, which exemplarily has a focal length of 50 mm, a minimum stop value of F22, ad a release stop value of F2.8, and possesses a shorter focal length and a deeper DOF than the telephoto lens A as shown in FIG. 9.

Figure 6G:
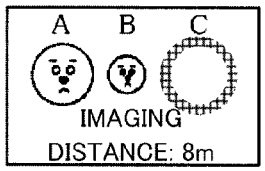
Figure 6H:
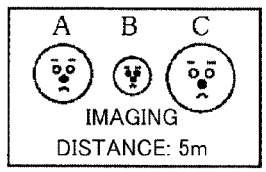
Figure 6I:
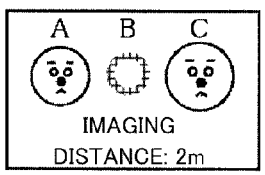

When the image data is obtained after the standard lens B is mounted and the focus lens is moved and focused upon the position 401 of 8 m at which Mr. B stands, the face of Mr. A can be detected because of the deep DOF but the face of the Mr. C is blurred and cannot be detected (FIG. 6G). When the image data is obtained after the focus lens is moved and focused upon the position of 5 m at which Mr. A stands, the faces of Messrs. B and C can be detected because of the deep DOF (FIG. 6H). When the image data is obtained when the focus lens is moved and focused upon the position of 2 m at which Mr. C stands, the face of Mr. A can be detected because of the deep DOF but the face of Mr. B is blurred and cannot be detected (FIG. 6I). Thus, it is understood that when the focus lens is moved and focused upon the position of 5 m, all the faces of the three persons can be detected from the obtained image data.

In FIGS. 6A-6L, the closest subject is distant by a photography distance of 2 m, and the farther subject is distant by a photography distance of 8 m. However, a closer subject or a farther subject is conceivable. In that case, the faces of all the subjects cannot always be detected at one position of the focus lens. In addition, when the lens unit 300 with a short focal length is used to obtain image data and when the focus lens is moved to the same position as that for the case with the long focal length, the same face can be detected a plurality of times. In other words, as in FIGS. 6G-6I, it takes a waste processing time because the face detected with certain image data is again detected with different image data.

Figure 6J:
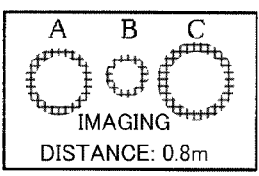
Figure 6K:
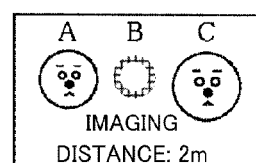
Figure 6L:
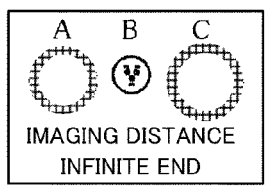

Accordingly, assume a focus detection process with image data obtained when a stop value in the photography with the standard lens B is F22 and when the focus lens is moved and focused upon three points of 0.8 m, 2.0 m, and the infinity as in the moving position information shown in FIG. 9. Then, as shown in FIGS. 6J-6L, single image data provides a face detection for the same face. Even when the subject is located at a closer position or a farther position, the face can be detected from the obtained image data. However, even when the moving position of the focus lens is optimized, the same subject can undergo face detection processes a plurality of times depending upon a subject's position.

Thus, when the moving position of the focus lens is changed as the focal length changes, the moving position of the focus lens can be optimized in obtaining the image data for the face detection process. Thereby, in the overall focusable distance range from the closest end to the infinity, the face of the subject is detected, the number of moving positions of the focus lens and the number of face detection processes can be reduced, and a time period necessary for the face detection can be shortened.

The telephoto lens A and the standard lens B are illustrative, and the moving position information depends upon the allowance scattering circle for the face detection. The information is not limited to one shown in FIG. 9, and is freely variable depending upon a condition of a focal length, a stop value, and an allowance scattering circle of an imaging lens.

Next, the flow moves to S1112, when the system control circuit 50 determines that the face detection has been successful (or the face detector 58 has actually provided a successful face detection process) (S1110). The system control circuit 50 stores information, such as a determination condition of a successful face detection in the face detection process, and a position on the image for which the face is detected, in the storage area of the memory 30 (S1112). On the other hand, the system control circuit 50 determines whether or not face detection images are obtained at all focus lens positions (S1114) when determining that the face detection process is failed (S1110) or after S1112. When determining that the face detection images are not obtained at all focus lens positions (S1114), the flow returns to S1104 so as to execute the face detection process at the remaining focus lens positions. When the system control circuit 50 determines that the face detection images are obtained at all focus lens positions (S1114), the focus lens position extractor 72 determines whether or not there are a plurality of focus lens positions extracted at which the face detection process has been successful (S1116).

When the focus lens position extractor 72 determines that there are a plurality of focus lens positions extracted at which the face detection process has been successful (S1116), the focus lens position selection process S1300 follows. When the focus lens position extractor 72 determines that there is only one focus lens position at which the face detection process has been successful (S1116), it extracts a focus range that contains the detected focus lens position as a focus control range (S1118). After S1300 or S1118, the focus control range setting part 74 performs a focus control range setting process (S1400), and the AF part 42 executes a focus control process with the focus control range set by the focus control range setting part 74 (S1120).

Figure 7:
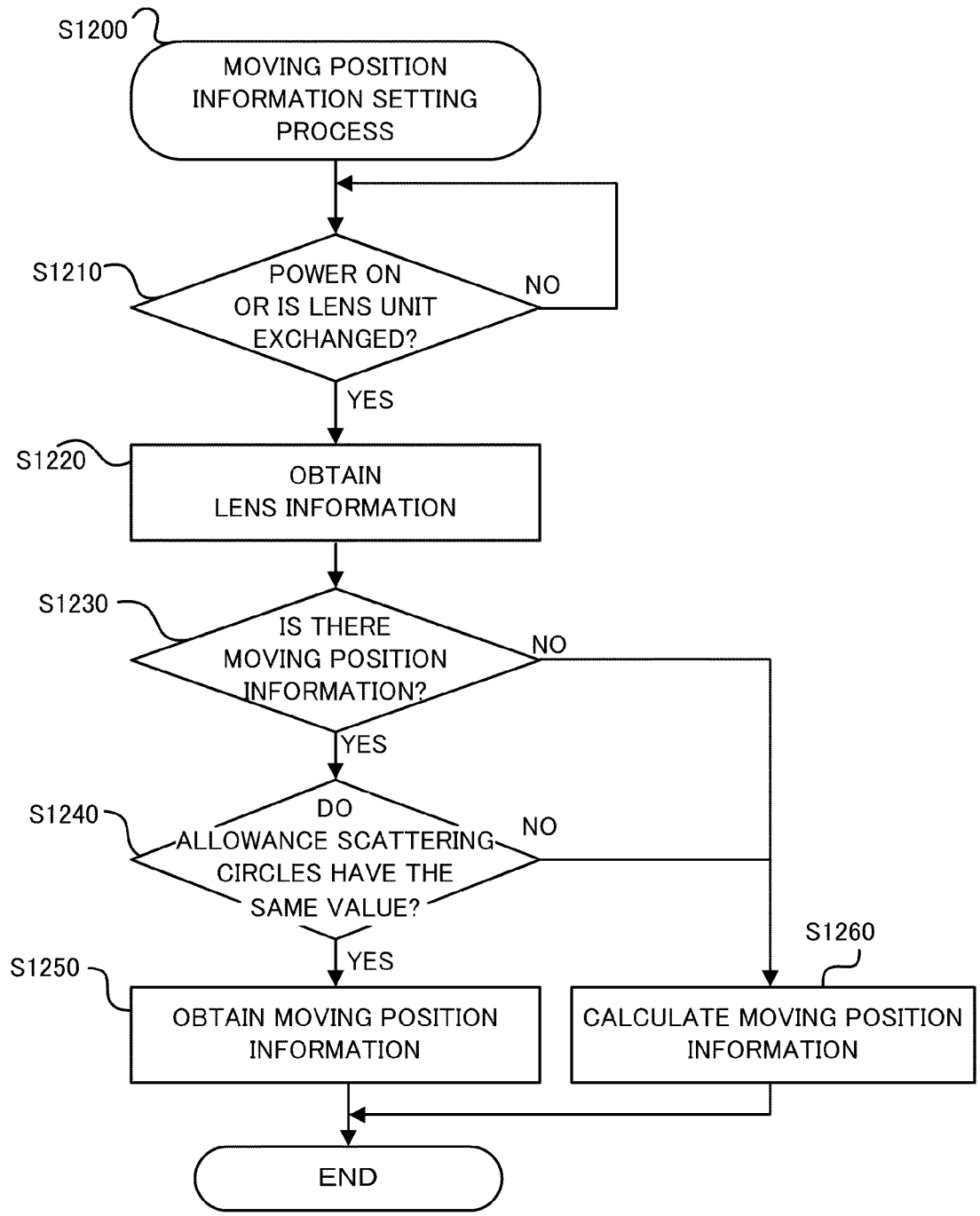
FIG. 7 is a detailed flowchart of S1200 shown in FIG. 5.

Referring now to FIG. 7, a detailed description will be given of S1200. FIG. 7 is a flowchart showing an operation of the system control circuit 50 in obtaining the lens information from the lens unit 300.

When detecting that the camera body 100 is powered on or that the lens unit 300 is exchanged (S1210), the system control circuit 50 communicates with the lens unit 300 through the interface 38. The system control circuit 50 obtains lens information of the lens unit 300 like the telephoto lens A shown in FIG. 8 (S1220). The specification of the telephoto lens A shown in FIG. 8 is merely illustrative. The lens information contains lens specific information, a focal length, a stop value, moving position information, and diameter information of an allowance scattering circle when the moving position information is set.

In order to set the moving position information, information of the allowance scattering circle of the camera body 100, such as a cell pitch of the image sensor 14 is necessary, in addition to information of the lens unit. Therefore, when the lens unit 300 sets the moving position information without using information from the camera body 100, a value of a diameter of the allowance scattering circle uses a preset value.

Next, the system control circuit 50 determines whether the obtained lens information contains the moving position information (S1230), and if so, the flow moves to S1240, and if not the flow moves to S1260. When the obtained lens information contains the moving position information, the system control circuit 50 determines whether a value of a diameter of an allowance scattering circle when the moving position information is set accords with a value of a diameter of the allowance scattering circle of the camera body 100 (S1240). Assume that the value of the diameter of the allowance scattering circle of the camera body 100 has been stored in the ROM 56.

The system control circuit 50 stores the obtained moving position information in the ROM 56 (S1250), when determining that the value of the diameter of the allowance scattering circle when the moving position information is set accords with the value of the diameter of the allowance scattering circle of the camera body 100. On the other hand, if not, the system control circuit 50 calculates appropriate moving position information from a value of a diameter of the allowance scattering circuit of the camera body 100 and the obtained moving position information, and stores the calculated moving position information in the ROM 56 (S1260). At this time, the lens unit 300 may obtain the appropriate moving position information. The lens unit 300 communicates with the camera body 100, obtains the value of the diameter of the allowance scattering circle, and obtains moving position information through the lens system controller 346 based on the stored moving position information and the obtained value of the diameter of the allowance scattering circle. The camera body 100 obtains the obtained moving position information and stores it in the ROM 56.

When the obtained lens information contains no moving position information, the system control circuit 50 calculates moving position information from an obtained focal length, stop value, and a value of a diameter of the obtained allowance scattering circle of the camera body 100, and stores the calculated moving position information in the ROM 56. Even in that case, the lens unit 300 may obtain the moving position information.

When the obtained lens information contains no moving position information, a data table of the lens specific information and the moving position information shown in FIG. 9 is previously prepared and the moving position information corresponding to the lens specific information may be read out instead of calculating the moving position information. Since the data table holds a plurality of pieces of moving position information, the face can be detected with the moving position information corresponding to the attached lens unit. The data table may be stored in the ROM 56. Alternatively, a recording medium that stores the data table shown in FIG. 9 may be connected to the camera body 100, and the moving position information corresponding to the mounted lens unit and the connected camera body 100 may be obtained from that recording medium and used for the face detection.

FIG. 7 obtains or calculates a moving position of a focus lens from which image data is obtained for face detections, when the power is turned on or the lens unit 300 is exchanged for expedited face detections at the live view time. However, the timing at which the moving position of the focus lens is obtained or calculated may be the live view start time or is not particularly limited. Similarly, the timing at which the lens information is obtained is not particularly limited to the power-on time or the time at which the lens unit 300 is exchanged.

Figure 10:
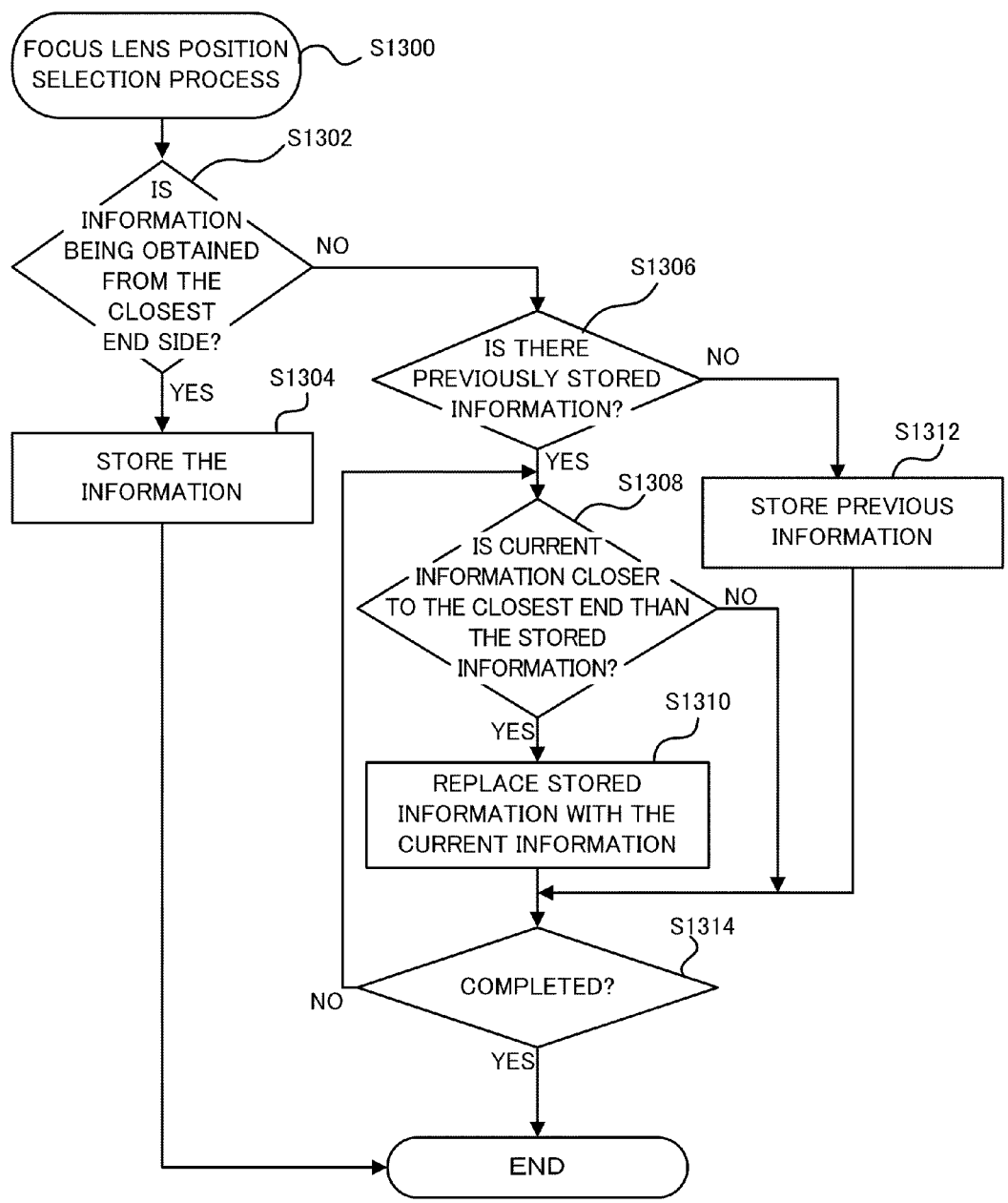
FIG. 10 is a detailed flowchart of one example of S1300 shown in FIG. 5.

Referring now to FIG. 10, a description will be given of one example of the focus lens position selection process S1300 shown in FIG. 5. FIG. 10 is a flowchart to select the closest focus lens position among a plurality of focus lens positions at which the face detection process has been successful.

Initially, the focus lens position extractor 72 determines whether or not the focus lens position is obtained from the closest end side (S1302). When determining that the focus lens position is obtained from the closest end side (S1302), the focus lens position extractor 72 selects and stores the closest focus lens position (S1304). When determining that the focus lens position is not obtained from the closest end side (S1302), the focus lens position extractor 72 determines whether there is the previously stored focus lens position information (S1306).

When determining that there is the previously stored focus lens position information (S1306), the focus lens position extractor 72 determines whether or not the focus lens position of the stored information is closer to the closest side than the focus lens position of the current information (S1308). When determining that the focus lens position of the stored information is closer to the closest side than the focus lens position of the current information (S1308), the focus lens position extractor 72 replaces the stored information with the current information (S1310). On the other hand, when determining that the focus lens position of the stored information is not closer to the closest side than the focus lens position of the current information (S1306), the focus lens position extractor 72 maintains the previously stored information (S1312).

When the focus lens position extractor 72 determines that the focus lens position of the stored information is closer to the infinity than the focus lens position of the current information (S1308), or after S1310 or S1312, the flow moves to S1314.

In S1314, the focus lens position extractor 72 determines whether or not information of all the focus lens positions at which the face detection process has been successful is investigated. When the focus lens position extractor 72 determines that there need additional investigations of information of the focus lens positions at which the face detection process has been successful (S1314), the flow returns to S1308 to resume the process. On the other hand, when determining that no investigation is left of information of the focus lens positions at which the face detection process has been successful (S1314), the focus lens position extractor 72 completes the process and returns to the original routine. The information held in S1304, S1310, and S1312 is information of the focus lens position extracted by the focus lens position extractor 72.

Figure 11:
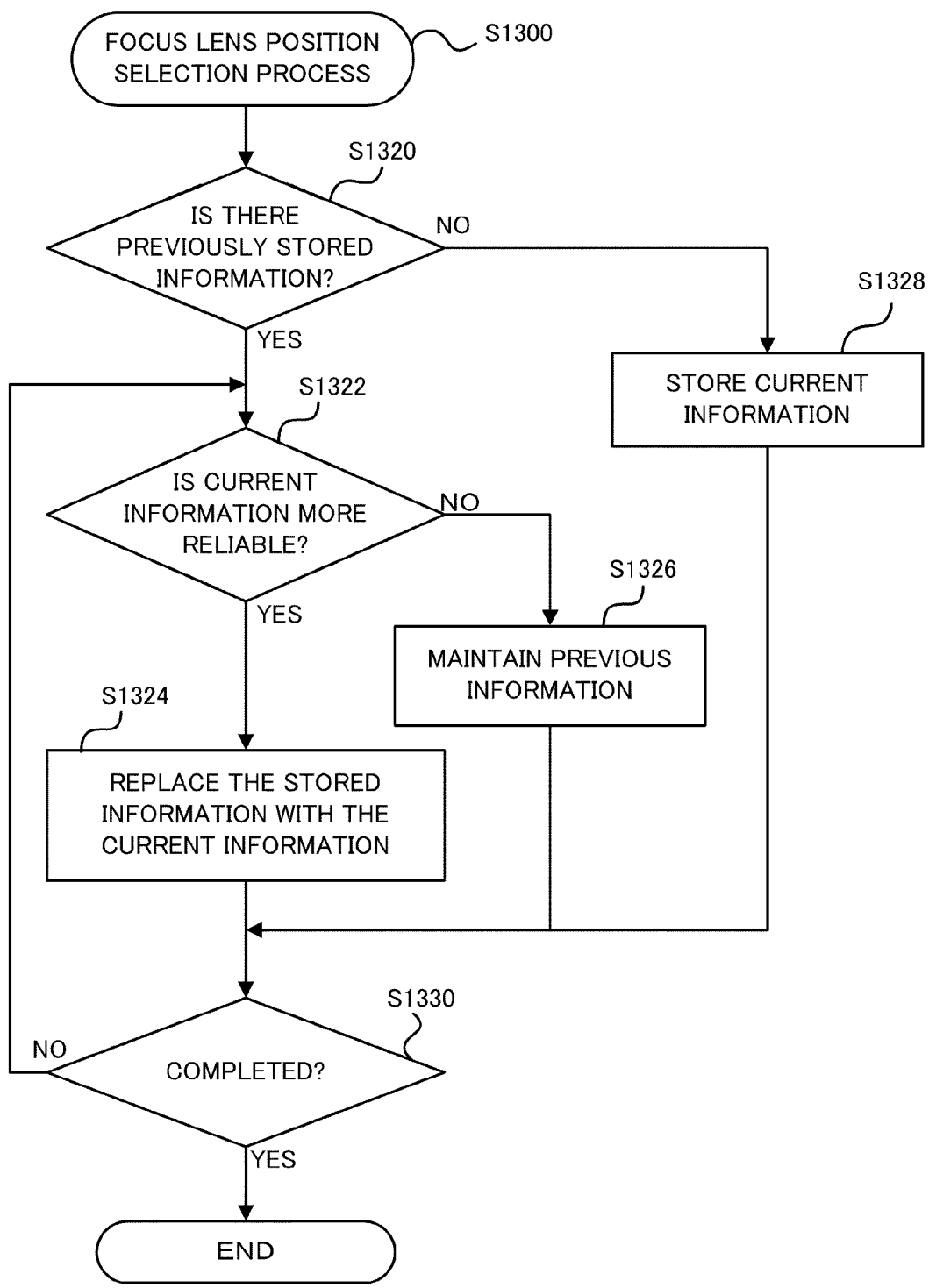
FIG. 11 is a detailed flowchart of another example of S1300 shown in FIG. 5.

Referring now to FIG. 11, a description will be given of another example of the focus lens position selection process S1300 shown in FIG. 5. FIG. 11 is a flowchart to select a reliable focus lens position among a plurality of focus lens positions at which the face detection process has been successful.

Initially, the focus lens position extractor 72 determines whether or not there has already been information based on the previously stored focus lens position at which the face detection process has been successful (S1320). When determining so (S1320), the focus lens position extractor 72 compares the reliability of the information based on the stored focus lens position at which the face detection process has been successful with that of the information of the current focus lens position at which the face detection process has been successful (S1322). When determining that the currently obtained information has a higher reliability (S1322), the focus lens position extractor 72 replaces the stored information with the information of the current focus lens position at which the face detection process has been successful (S1324). On the other hand, when determining that the previously obtained information has a higher reliability (S1322), the focus lens position extractor 72 maintains the previously stored information (S1326). On the other hand, when determining that there is no information based on the focus lens position (S1320), the focus lens position extractor 72 maintains the current information in the storage area (S1328). After S1324, S1326, or S1328, the focus lens position extractor 72 determines whether or not information of all the focus lens positions at which the face detection process has been successful is completely investigated (S1330). When the focus lens position extractor 72 determines that there are additional investigations of information of the focus lens positions at which the face detection process has been successful (S1330), the flow returns to S1322 to resume the process. On the other hand, when determining that no investigation is left of information of the focus lens positions at which the face detection process has been successful (S1330), the focus lens position extractor 72 completes the process and returns to the original routine. The information held in S1324, S1326, and S1328 is information of the focus lens position extracted by the focus lens position extractor 72.

Figure 12:
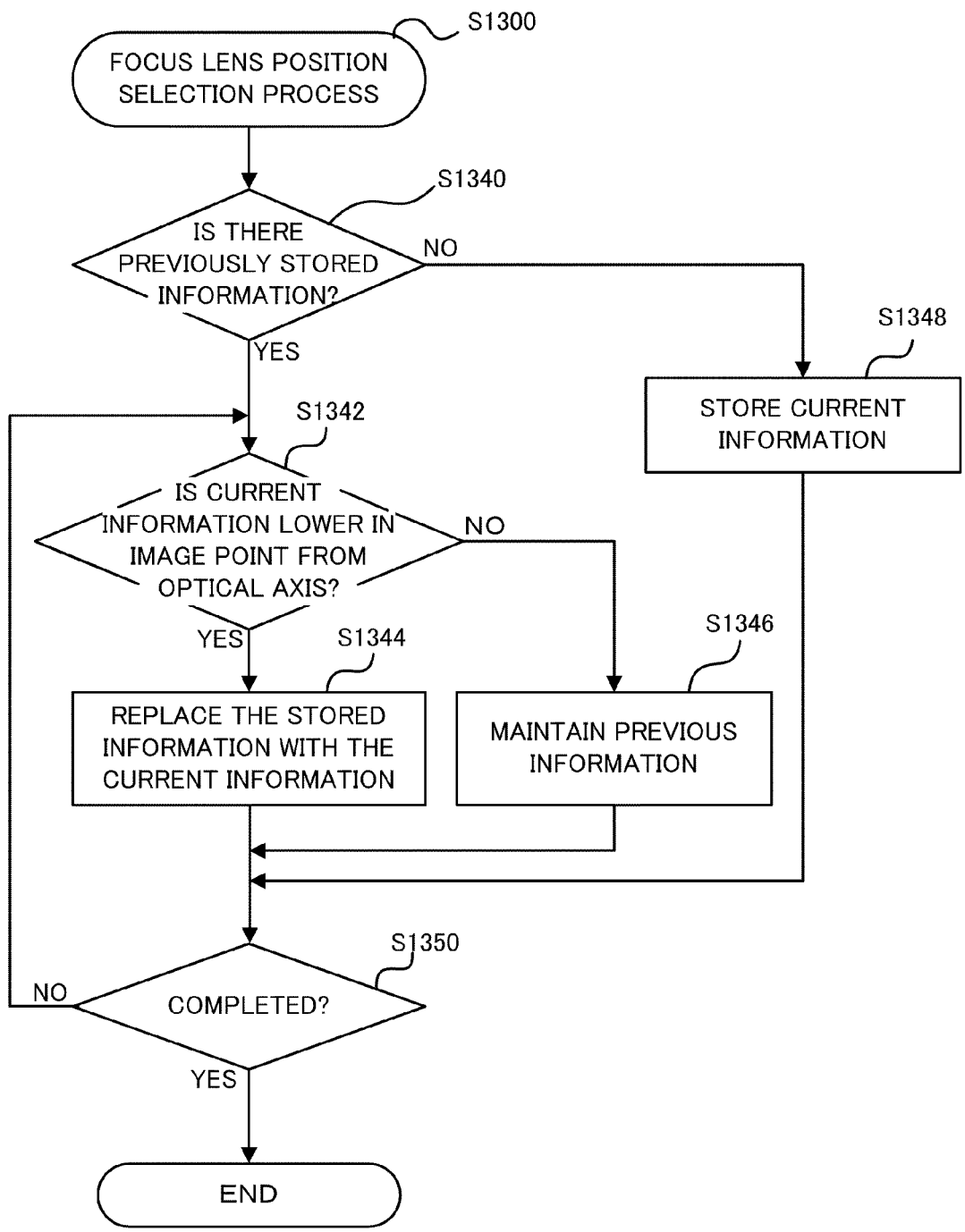
FIG. 12 is a detailed flowchart of still another example of S1300 shown in FIG. 5.
Figure 13:
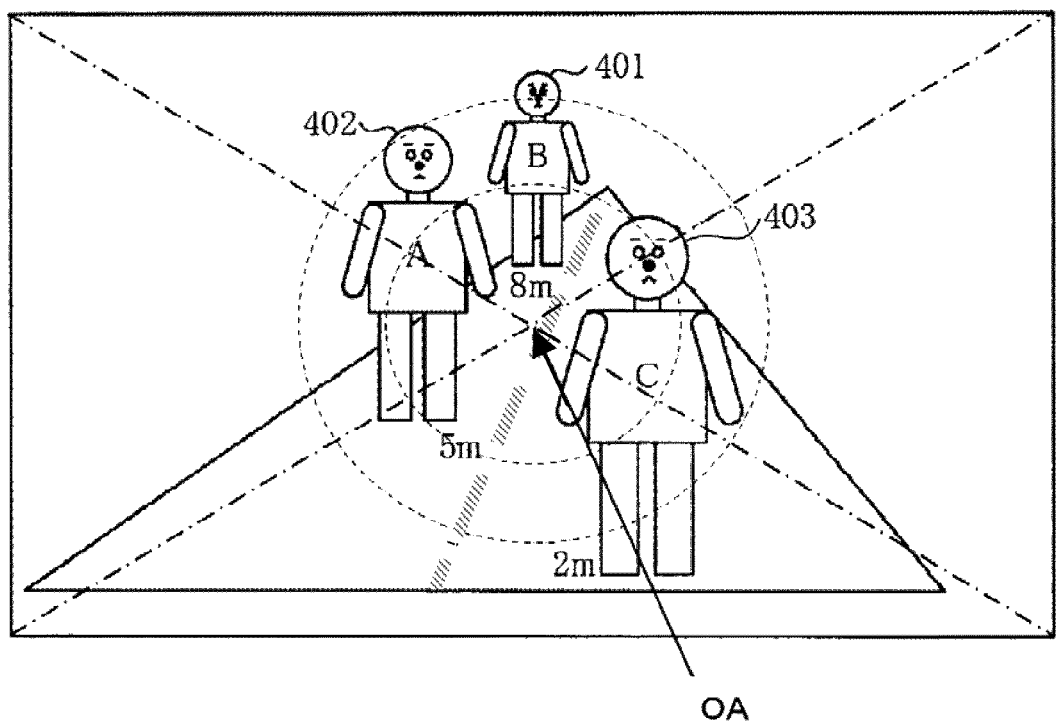
FIG. 13 is a view showing a screen optical axis of an imaging screen.

Referring now to FIG. 12, a description will be given of still another example of the focus lens position selection process S1300 shown in FIG. 5. FIG. 12 is a flowchart to select a focus lens position in which an area in which the face detection process has been successful has a minimum image point (distance) from a screen optical axis among a plurality of focus lens positions at which the face detection process has been successful. As shown in FIG. 13, the screen optical axis OA is a center position (center of gravity position) of the imaging screen on the assumption that a main subject is often located at the center of the screen (or forms a "Hinomaru" composition picture). In FIG. 13, there are three persons, i.e., Messrs. A, B, and C, in the screen. Among them, Mr. C has the lowest image point from the screen optical axis, Mr. A is next, and Mr. B has the highest image point from the screen optical axis.

Initially, the focus lens position extractor 72 determines whether or not there is information based on the previously stored focus lens position at which the face detection process has been successful (S1340). When determining so (S1340), the focus lens position extractor 72 compares the image point of the information based on the stored focus lens position at which the face detection process has been successful with that of the information of the current focus lens position at which the face detection process has been successful (S1342). When determining that the currently obtained information has a lower image point from the screen optical axis (S1342), the focus lens position extractor 72 replaces the stored information with the information based on the current focus position at which the face detection process has been successful (S1344). On the other hand, when determining that the previously obtained information has a lower image point from the screen optical axis (S1342), the focus lens position extractor 72 maintains the previously stored information (S1346). On the other hand, when determining that there is no information based on the focus lens position (S1340), the focus lens position extractor 72 stores the current information in the storage area (S1348). After S1344, S1346, or S1348, the focus lens position extractor 72 determines whether or not information of all the focus lens positions at which the face detection process has been successful is completely investigated (S1350). When the focus lens position extractor 72 determines that there are additional investigations of information of the focus lens positions at which the face detection process has been successful (S1350), the flow returns to S1342 to resume the process. On the other hand, when determining that no investigation is left of information of the focus lens positions at which the face detection process has been successful (S1350), the focus lens position extractor 72 completes the process and returns to the original routine. The information held in S1344, S1346, and S1348 is information of the focus lens position extracted by the focus lens position extractor 72.

When the face detection process is executed based on the flowchart of FIG. 12, Mr. C is selected in FIG. 13.

Figure 14:
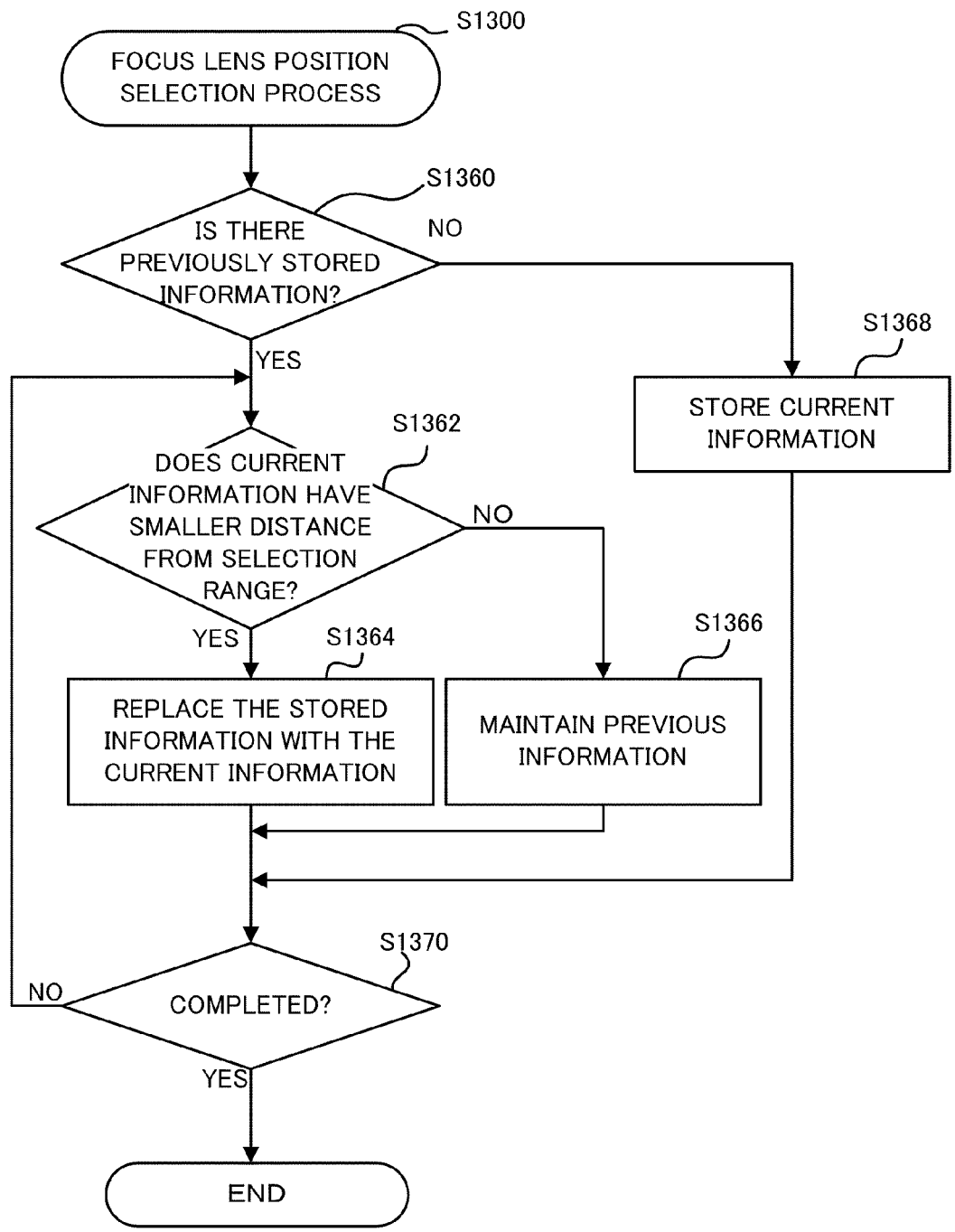
FIG. 14 is a detailed flowchart of still another example of S1300 shown in FIG. 5.

Referring now to FIG. 14, a description will be given of still another example of the focus lens position selection process S1300 shown in FIG. 5. FIG. 14 is a flowchart to select a focus lens position having a minimum image point from a set selection area at which the face detection process has been successful among a plurality of focus lens positions at which the face detection process has been successful.

Initially, the focus lens position extractor 72 determines whether or not there is information based on the previously stored focus lens position at which the face detection process has been successful (S1360). When determining so (S1360), the focus lens position extractor 72 compares the image point from the selection area of the information based on the stored focus lens position with that of the information of the current focus lens position (S1362). When determining that the currently obtained information has a lower image point from the selection range (S1362), the focus lens position extractor 72 replaces the stored information with the current information at which the face detection process has been successful (S1364). On the other hand, when determining that the previously obtained information has a lower image point from the selection area (S1362), the focus lens position extractor 72 maintains the previously stored information (S1366). On the other hand, when determining that there is no information stored based on the focus lens position (S1360), the focus lens position extractor 72 stores the current information in the storage area (S1368). After S1364, S1366, or S1368, the focus lens position extractor 72 determines whether or not information of all the focus lens positions at which the face detection process has been successful is completely investigated (S1370). When the focus lens position extractor 72 determines that there are additional investigations of information of the focus lens positions at which the face detection process has been successful (S1370), the flow returns to S1362 to resume the process. On the other hand, when determining that no determination is left of information of the focus lens positions at which the face detection process has been successful (S1370), the focus lens position extractor 72 completes the process and returns to the original routine. The information held in S1364, S1366, and S1368 is information of the focus lens position extracted by the focus lens position extractor 72.

Figure 15:
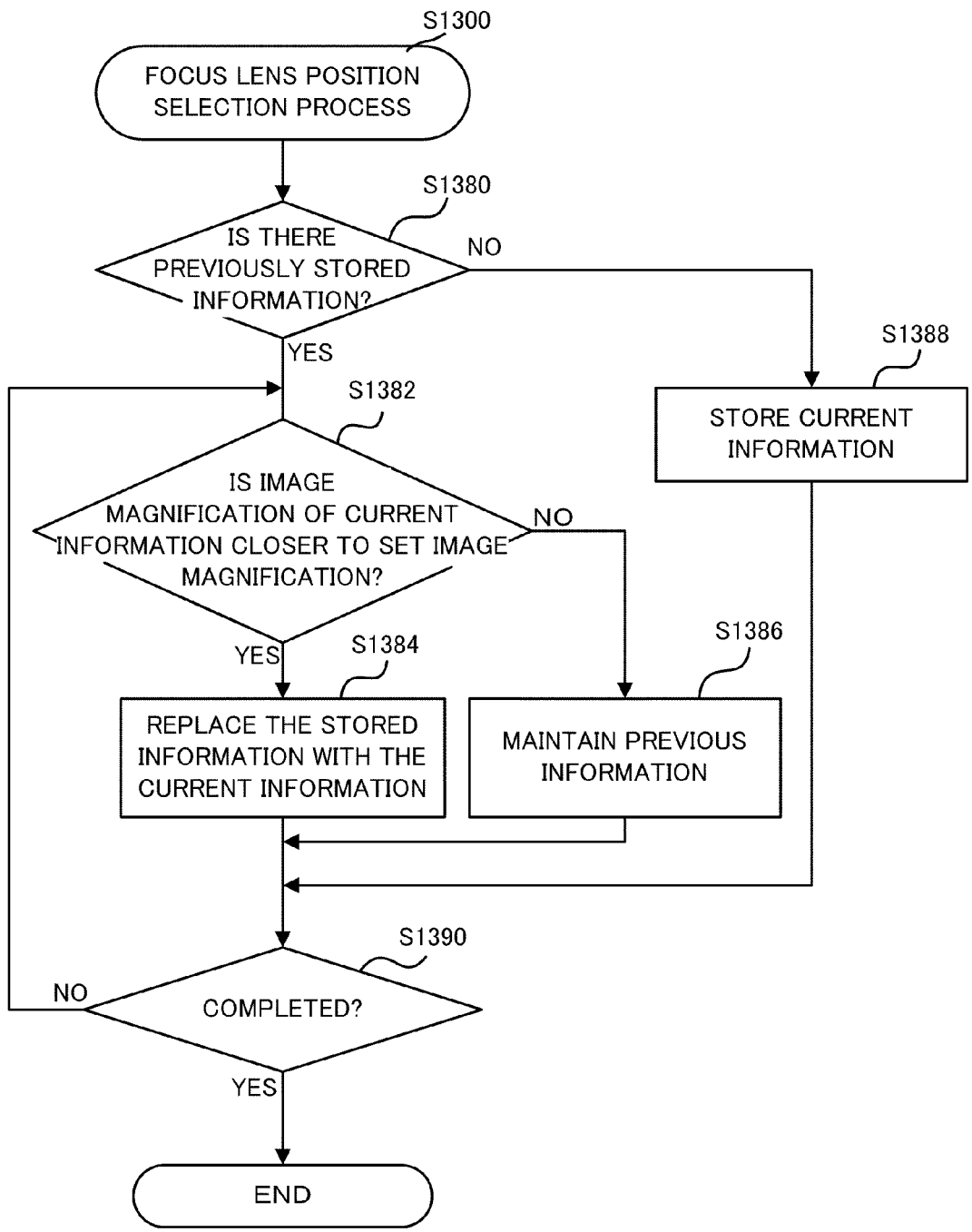
FIG. 15 is a detailed flowchart of still another example of S1300 shown in FIG. 5.

Referring now to FIG. 15, a description will be given of still another example of the focus lens position selection process S1300 shown in FIG. 5. FIG. 15 is a flowchart to select a focus lens position having an image magnification closer to a set image magnification at which the face detection process has been successful among a plurality of focus lens positions at which the face detection process has been successful. When there is a plurality of subjects, a subject having a size intended by the photographer can be selected and a size of the subject can be properly controlled, by selecting a subject that is located at a position having an image magnification closer to the preset image magnification.

Initially, the focus lens position extractor 72 determines whether or not there is information based on the previously stored focus lens position at which the face detection process has been successful (S1380). When determining so (S1380), the focus lens position extractor 72 compares the image magnification of the information based on the stored focus lens position at which the face detection has been successful with that of the information of the current focus lens position at which the face detection has been successful (S1382) When determining that the currently obtained information has an image magnification closer to the set image magnification (S1382), the focus lens position extractor 72 replaces the stored information with the information based on the current focus position at which the face detection process has been successful (S1384). On the other hand, when determining that the previously obtained information has an image magnification closer to the set image magnification (S1382), the focus lens position extractor 72 maintains the previously stored information (S1386). On the other hand, when determining that there is no information stored based on the focus lens position (S1380), the focus lens position extractor 72 stores the current information in the storage area (S1388). After S1384, S1386, or S1388, the focus lens position extractor 72 determines whether or not information of all the focus lens positions at which the face detection process has been successful is completely investigated (S1390). When the focus lens position extractor 72 determines that there are additional investigations of information of the focus lens positions at which the face detection process has been successful (S1390), the flow returns to S1382 to resume the process. On the other hand, when determining that no investigation is left of information of the focus lens positions at which the face detection process has been successful (S1390), the focus lens position extractor 72 completes the process and returns to the original routine. The information held in S1384, S1386, and S1388 is information of the focus lens position extracted by the focus lens position extractor 72.

Figure 16:
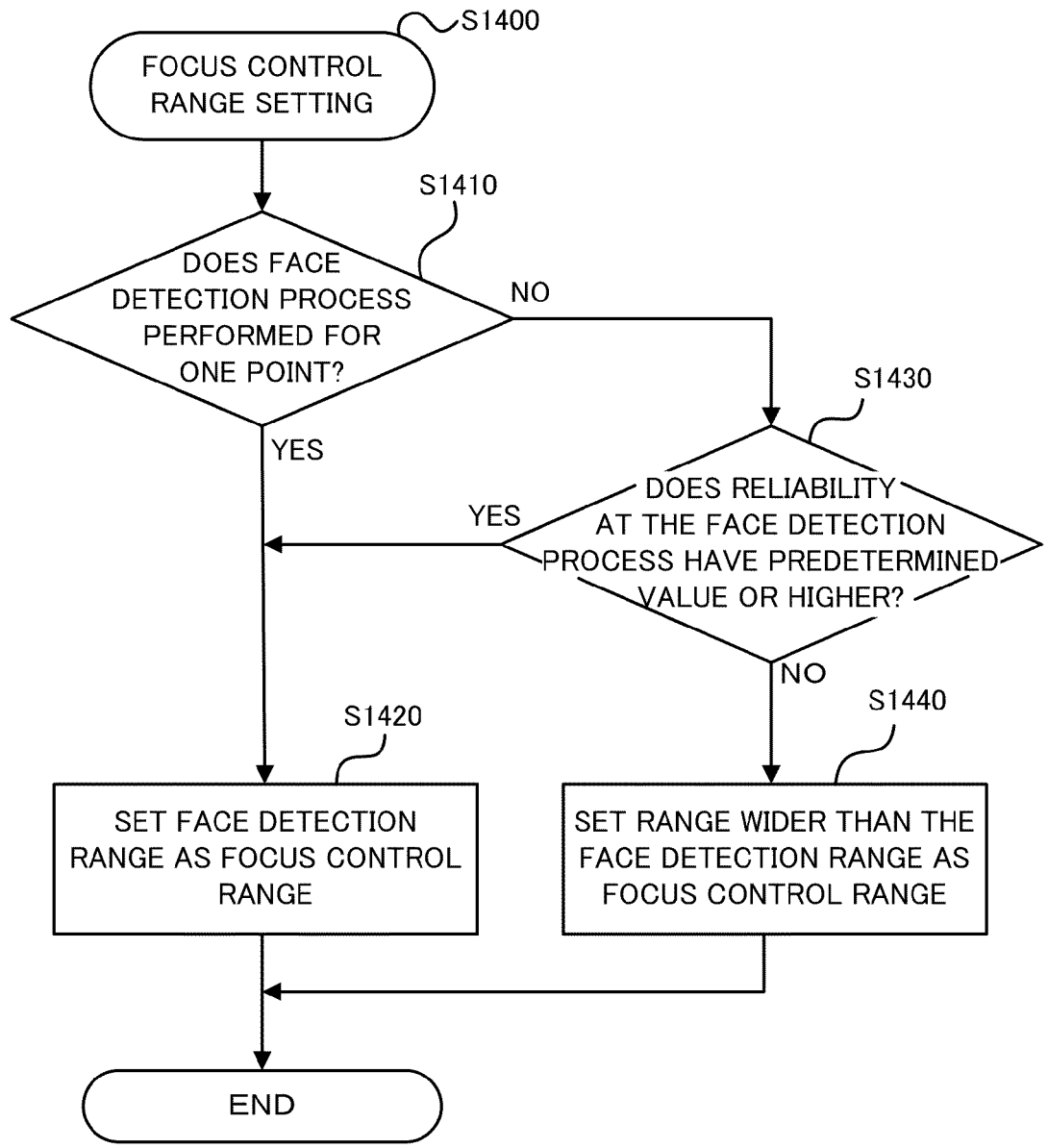
FIG. 16 is a detailed flowchart of S1400 shown in FIG. 5.

Referring now to FIG. 16, a description will be given of one example of the focus control range setting process S1400 shown in FIG. 5. FIG. 16 is a flowchart showing a process of setting the focus control range by the focus control range setting part 74.

Initially, the focus control range setting part 74 determines whether the number of points (focus lens positions) at which the face detection process has been performed extracted by the focus lens position extractor 72 is singular or plural (S1410). When determining that there is one point for which the face detection process has been performed (S1410), the focus control range setting part 74 sets a range of the face detection process to the focus control range (S1420), and the flow returns to the main routine. On the other hand, when determining that there is a plurality of points for which the face detection process has been performed (S1410), the focus control range setting part 74 determines whether or not reliability is equal to or higher than a predetermined value at the face detection process time (S1430). When the focus control range setting part 74 determines that the reliability of the face detection process time is equal to or higher than the predetermined value (S1430), the flow moves to S1420. On the other hand, when determining that the reliability of the face detection process time is lower than the predetermined value (S1430), the focus control range setting part 74 sets a range broader than the face detection range used for the selected face detection process to the focus control range (S1440), and the flow returns to the main routine.

FIG. 16 enlarges the focus control range only when the reliability is low at the face detection process (or when the similarity between the face of the subject and the previously stored face pattern is low), but the present invention is not limited to this condition. For example, a setting condition of the focus control range may be changed in accordance with the condition of the face detection process (such as a focal length and a stop value) and an image state at the face detection process.

The above description discusses a plurality of processes of selecting a focus lens position from among a plurality of focus lens positions at which the face detection process has been successfully performed, but a plurality of conditions may be combined for the process rather than performing each process singularly. In addition, each process performs a focus control process in accordance with a preset condition, but it is manually selected from an area in which the focus detection process has been successfully performed. A type of a lens is not limited, such as a zoom lens, and a focal length is not limited. Thus, a face detection process is performed in accordance with a focal length of a lens unit 300, and a focus control time period can be shortened by setting a focus control range based on the face detection result.

Second Embodiment

Figure 17:
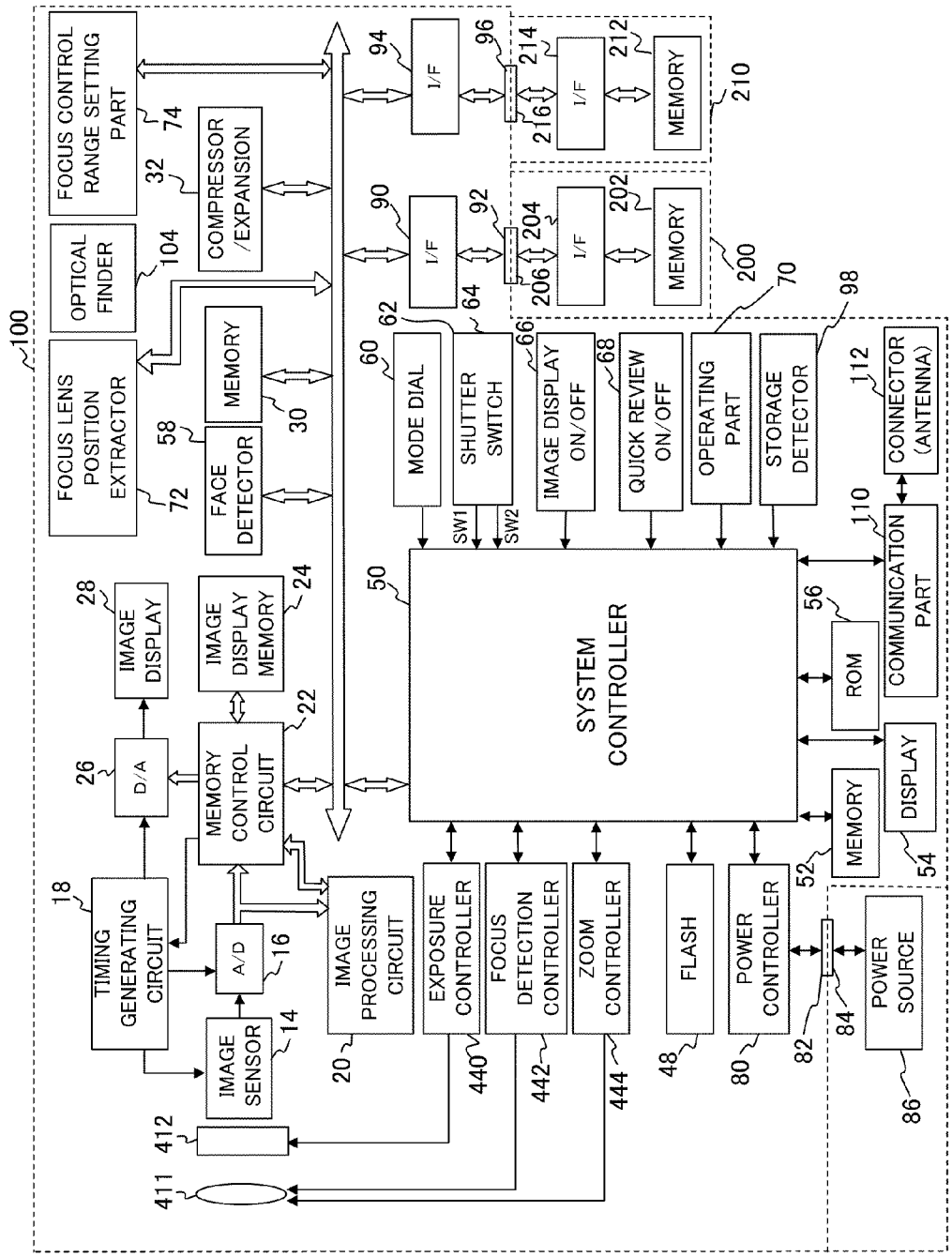
FIG. 17 is a block diagram showing a structure of a lens united type digital camera.

FIG. 17 is a block diagram of a lens united type digital camera according to a second embodiment. Those elements in FIG. 17, which are the corresponding elements in FIG. 1, are designated by the same reference numerals, and a description thereof will be omitted.

Reference numeral 411 denotes an imaging lens, which includes a focus lens and a zoom lens. Reference numeral 412 denotes a shutter having a stop function. Reference numeral 440 denotes an exposure controller that controls the shutter 412 having the stop function, and has a flash compensation function in association with the flash 48. Reference numeral 442 denotes a focus detection controller configured to control focusing of the imaging lens 411. Reference numeral 444 denotes a zoom controller configured to control zooming of the lens.

Different from the first embodiment, this embodiment uses a lens united type digital camera in which a image pickup optical system including a lens and a stop is provided to an image pickup apparatus body, and a process shown in FIG. 7 is not performed. In this case, setting of the moving position information in S1200 is performed through a calculation by the system control circuit 50 based on a focal length of the imaging lens 411 and a stop value of the shutter 412. Alternatively, the moving position information corresponding to the focal length and the stop value may be previously stored as a data table shown in FIG. 18 in the ROM 56.

The operation relating to the face detection is performed similar to the flowchart shown in FIG. 5. Since the moving position information is calculated based on the focal length of the imaging lens 411 and the stop value of the shutter 412, the focal length and the stop value may use ones when a half-press of the shutter button is detected. Similarly, when the moving position information is stored as the data table, the moving position information corresponding to the focal length and the stop value is read out when the half-press of the shutter button is detected.

Since this embodiment is different from the first embodiment in that the imaging lens is a united type or an exchange type, this embodiment can also provides the face detection result shown in FIG. 3.

Thus, a moving position of a focus lens can be optimized by changing that when a stop value changes, in obtaining image data for the face detection process. In addition, a moving position of a focus lens can be optimized by changing that when a focal length changes, in obtaining image data for the face detection process. Thereby, a face can be detected at an appropriate focus lens position in an overall focusable distance range from the closest end to the infinity, and a time period for the focus control process can be shorted when the focus control is performed in an area including the focus lens position for which the face is detected.

The present invention can also be implemented by supplying a recording medium that stores a program code of software that implements the functions of the first and second embodiments to a system or an apparatus, and by reading out and executing the program code stored in the recording medium at the CPU of the system or the apparatus. In that case, the program code itself read out from the recording medium implements the functions of the above embodiments, and the recording medium that records the program code constitutes the present invention. Of course, the present invention intends to cover an operating system that runs on a computer based on a command of the program code performs part or all of the actual processes, and the process implements the functions of the above embodiments. The conceivable recording medium that stores the program code includes, for example, a flexible disc, a hard disc drive, a ROM, a RAM, a magnetic tape, a ROM card, a CD-ROM, a CD-R, a DVD, an optical disc, an opto-magnetic disc, and a MO. In addition, a computer network, such as a local area network ("LAN") or a wide area network ("WAN") may be used to supply a program code.

While the above two embodiments discuss a digital camera, another image pickup apparatus, such as a digital video camera, is applicable as long as the image pickup apparatus has means for detecting a face of a person as a subject from obtained image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-088824, filed Mar. 28, 2008, which is hereby incorporated by reference herein in its entirety.

What is claimed is:

1. An image pickup apparatus comprising:
a face detector configured to provide a face detection process based on image data obtained from an image pickup optical system that includes a focus lens configured to provide a focus control;
a focus lens position extractor configured to extract a focus lens position at which the face detector has actually provided a successful face detection process from among a plurality of focus lens positions set as a candidate position for the focus lens to be arranged when the face detector provides the face detection process, wherein a range in which the face detector provides the successful face detection process for a distance from the image pickup apparatus changes depending on a position where the focus lens is moved among the plurality of focus lens positions;
a focus control range setting part configured to set a focus control range in a focus range that contains the focus lens position extracted by the focus lens position extractor; and
an autofocus controller configured to provide autofocus control in the focus control range set by the focus control range setting part.

2. An image pickup apparatus according to claim 1, wherein the focus control range setting part sets as the focus control range a focus lens position that is closest to the closest end, among the focus lens positions at which the face detector has actually provided the successful face detection process.

3. An image pickup apparatus according to claim 1, wherein the focus control range setting part sets as the focus control range a focus range that contains a focus lens position having the shortest distance between an area of the successful face detection process and a screen optical axis of the image data with which the face detector has actually provided the successful face detection process.

4. An image pickup apparatus according to claim 1, wherein the focus control range setting part sets as the focus control range a focus range that contains a focus lens position having the shortest distance between an area of the successful face detection process and a preset position in the image data with which the face detector has actually provided the successful face detection process.

5. An image pickup apparatus according to claim 1, wherein the focus control range setting part sets as the focus control range a focus range that contains a focus lens position having the most reliable face detection process among image data with which the face detector has actually provided the successful face detection process.

6. An image pickup apparatus according to claim 1, wherein the focus control range setting part sets as the focus control range a focus range that contains a focus lens position closest to a preset image magnification of a shot image among image data with which the face detector has actually provided the successful face detection process.

7. An image pickup apparatus according to claim 1, wherein the focus control range setting part changes a focus control range relative to a face detection range that contains a set focus lens position according to a reliability of the face detection process.

8. An image pickup apparatus according to claim 1, wherein the focus control range setting part sets the focus control range so that the focus control range can be broader than a face detection range.

9. An image pickup apparatus according to claim 1, wherein the focus control range setting part sets the focus control range in the same range as a face detection range that contains a set focus lens position.

* * * * *